United States Patent [19]

Spillman, Jr. et al.

[11] Patent Number: 5,747,698

[45] Date of Patent: May 5, 1998

[54] CAPACITIVE Z-AXIS STRAIN GAUGE

[75] Inventors: William Bert Spillman, Jr., Charlotte, Vt.; Eric M. Weissman, Russell Township, Ohio

[73] Assignee: Simmonds Precision Products Inc., Akron, Ohio

[21] Appl. No.: 637,024

[22] Filed: Apr. 24, 1996

[51] Int. Cl.[6] .................................. G01B 7/16; G01N 3/00
[52] U.S. Cl. ........................... 73/780; 73/777; 73/776; 73/774
[58] Field of Search ............................. 73/780, 777, 776, 73/774; 361/277, 280, 281, 283.1

[56] References Cited

U.S. PATENT DOCUMENTS

| | | | |
|---|---|---|---|
| 2,654,060 | 9/1953 | Stovall, Jr. et al. | 73/780 |
| 2,933,665 | 4/1960 | Dimeff | 317/246 |
| 3,621,377 | 11/1971 | Lim | 361/280 |
| 3,933,034 | 1/1976 | Noel et al. | 73/88.5 R |
| 4,603,371 | 7/1986 | Frick | 73/724 |
| 4,636,714 | 1/1987 | Allen | 324/678 |
| 4,661,797 | 4/1987 | Schmall | 340/561 |
| 4,939,930 | 7/1990 | Ishizuki et al. | 73/780 |
| 4,944,181 | 7/1990 | Wnuk | 73/780 |
| 5,084,801 | 1/1992 | El-Hamamsy et al. | 361/277 |
| 5,097,216 | 3/1992 | Dimmick, Sr. et al. | 324/671 |
| 5,121,929 | 6/1992 | Cobb | 277/2 |
| 5,192,871 | 3/1993 | Ramakrishnan et al. | 361/277 |
| 5,414,589 | 5/1995 | Amano et al. | 361/277 |
| 5,433,115 | 7/1995 | Spillman, Jr. et al. | 73/773 |

OTHER PUBLICATIONS

Jackman et al., "Fabrication of submicrometer Features on Curved Substrates by Microcontact Printing," Science, vol. 269, Aug. 4, 1995, pp. 664–665.

*Primary Examiner*—Richard Chilcot
*Assistant Examiner*—Max H. Noori
*Attorney, Agent, or Firm*—Leonard L. Lewis; William E. Zitelli

[57] ABSTRACT

A strain gauge device for detecting force applied to a planar structure, the device including a capacitor having two spaced conductive surfaces, and a dielectric material between the conductive surfaces with a dielectric constant that varies in relation to strain force normal to the surfaces. In one embodiment, the dielectric material is realized in the form of a pair of facing linear molecule monolayers attached endwise to the respective conductive layers and oriented at an oblique angle to the layers.

34 Claims, 2 Drawing Sheets

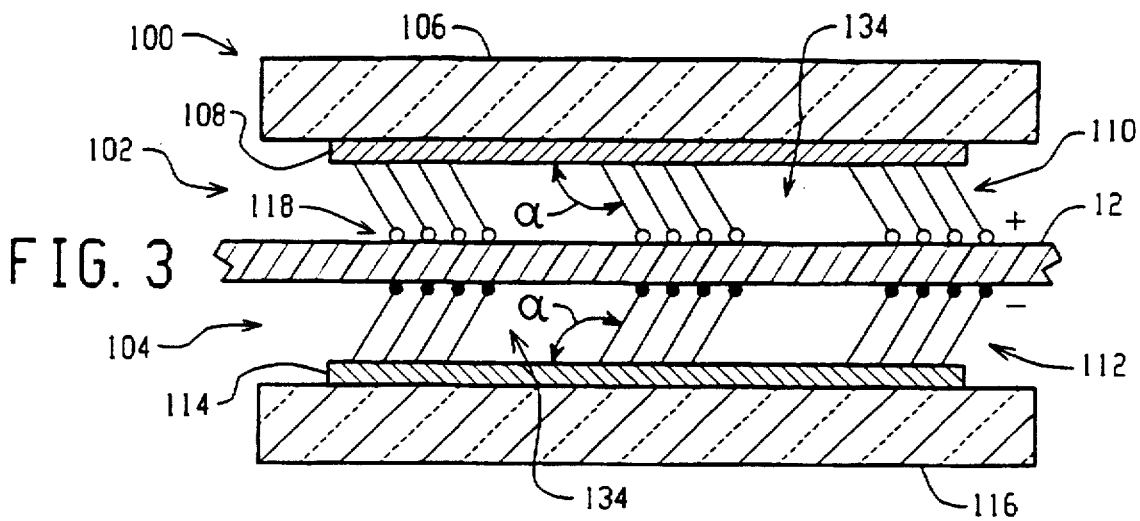
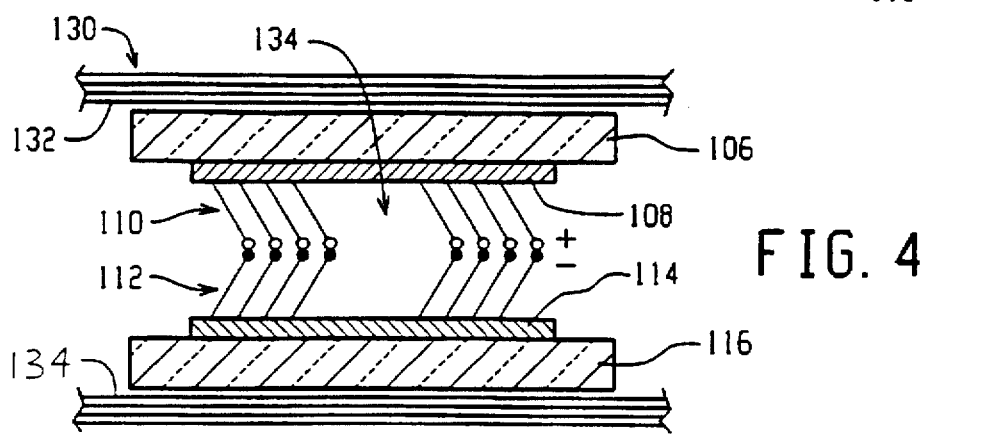
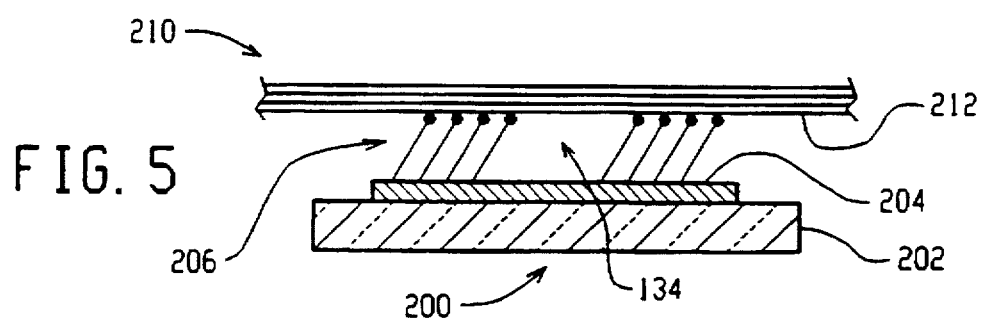
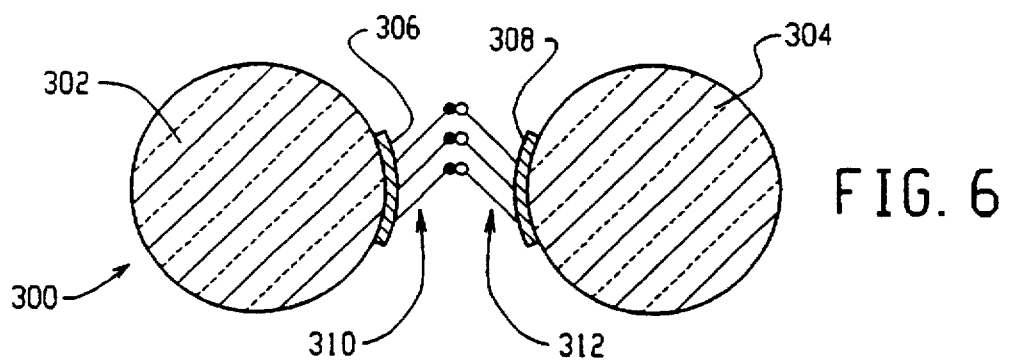

CAPACITIVE Z-AXIS STRAIN GAUGE

BACKGROUND OF THE INVENTION

The invention relates generally to measuring and detecting strain in composite structures. More particularly, the invention relates to detecting out-of-plane strain or stress in a laminated composite structure.

Significant advances have been made in developing new high performance materials such as, for example, graphite/epoxy composites. These materials and many other composite types hold great promise for replacing conventional materials such as steel and aluminum in structures subjected to various environmental conditions such as high temperature, pressure, stress and strain. For example, carbon composite materials are expected to be used extensively in next generation aircraft for structures such as the wings and other air foil surfaces, engine drive shafts and so on just to name a few examples.

Conventional strain gauges, such as resistive strain gauges, are useful for detecting and measuring strain in the plane of the sensor. Such conventional devices however are not as useful for measuring strain that is out-of-plane, i.e. has a component normal to the plane of the sensor.

Accordingly, the objectives exist for a strain gauge device that can be used to detect or measure strain having a component normal to the plane of the sensor. Such a device should be compatible with being embedded in a laminated composite structure for detecting, for example, strain normal to the plane of the laminates that tend to cause delaminations and other structural defects.

SUMMARY OF THE INVENTION

To the accomplishment of the foregoing objectives, the present invention contemplates, in one embodiment, a strain gauge device in the form of a capacitor having two spaced conductive surfaces, and a dielectric material between the conductive surfaces with a dielectric constant that varies in relation to strain normal to the surfaces.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 3 is a cross-sectional view of a capacitive strain gauge device taken along the line 3—3 in FIG. 1;

FIG. 4 is cross-sectional view of a capacitive strain gauge device similar to the example of FIG. 3 but built as a discrete device;

FIG. 5 is an alternative embodiment of a capacitive strain gauge device in accordance with the invention; and FIG. 6 is still another embodiment of a capacitive strain gauge device in accordance with the invention.

DETAILED DESCRIPTION OF THE INVENTION

Figure 1:
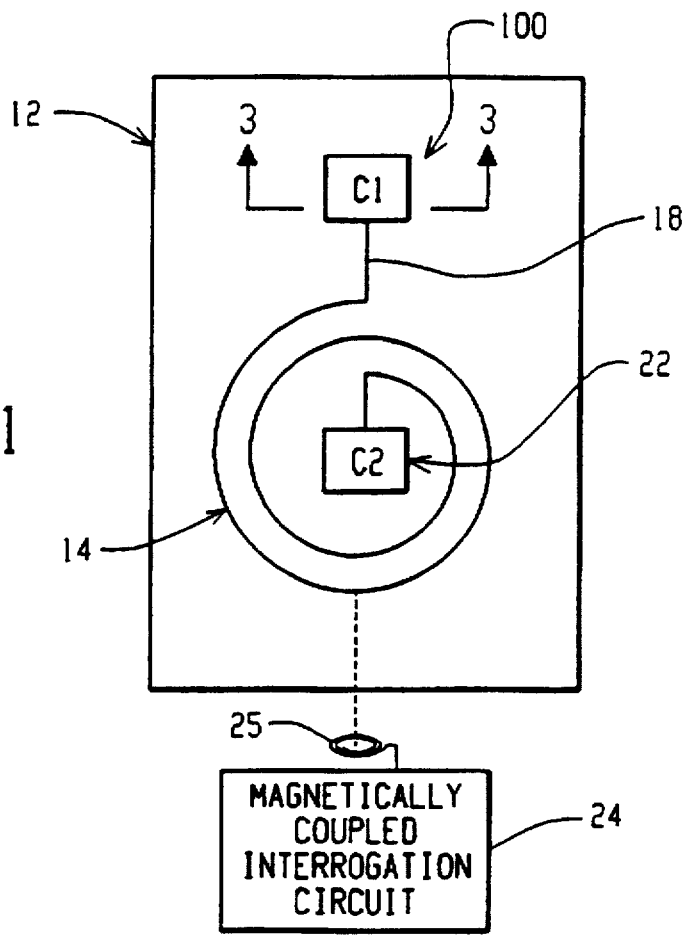
FIGS. 1 and 2 are top and bottom diagrammatic illustrations in plan of an apparatus for detecting out-of-plane strain using a capacitive strain gauge according to the present invention.
Figure 2:
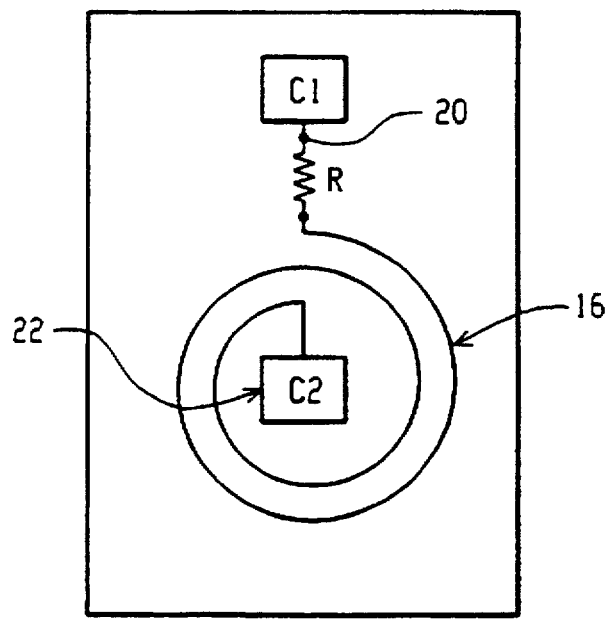

With reference to FIGS. 1 and 2, we show in diagrammatic form an apparatus 10 that embodies the present invention having a strain gauge device or sensor 100 useful for detecting and measuring strain in a structure. Although specific reference is made herein to embedded sensors, those skilled in the art will readily appreciate that the term "embedded" is intended to be interpreted in its broadest sense to include, for example, sensors disposed on a surface of or integrated with a structure. The invention can also be used in the form of a discrete device that is embeddable, or the invention can be used in non-embedded applications. The invention is particularly useful for detecting stresses, such as out-of-plane strain, in laminated structures such as composite structures; however, the invention can be used in other applications where it is desired to detect forces normal to the plane of the device. It will be understood by those skilled in the art that any out-of-plane strain applied to the sensor will have a force vector component that is normal to the sensor and therefore will be detectable. Thus the invention is not limited to detecting stresses that are only normal to the plane of the device. The strain and stress that can be detected by the present invention may be produced, for example, by pressure effects, local bending, delamination effects and so on.

With continued reference to FIGS. 1 and 2, an embeddable remotely interrogated apparatus 10 that incorporates a capacitive strain gauge 100 in accordance with the invention is illustrated. This particular apparatus can be interrogated in a contactless manner by use of magnetically coupled inductive coils. A suitable arrangement for such contactless interrogation is described in U.S. Pat. No. 5,433,115 issued to Spillman et al., and pending U.S. patent applications Ser. Nos. 08/245,945 filed May 19, 1994 and 08/076,322 filed on Jun. 14, 1993, all three disclosures owned in common by the assignee of the present invention, the entire disclosures of which are fully incorporated herein by reference. Those skilled in the art will appreciate that a strain gauge in accordance with the present invention can also be interrogated or sensed using a hard wired connection thereto if so desired for a particular application. The device 100 could also be hard wire connected to a non-embedded circuit that performs a frequency sweep to detect the capacitance of the device.

In FIGS. 1 and 2, the apparatus 10 includes a substrate 12 (FIG. 1 illustrates a top plan view and FIG. 2 illustrates a bottom plan view of the substrate). In this embodiment of the invention, the substrate 12 is a thin, flexible coupon of insulative material. For example, a 0.01 inch thick piece of insulative material, such as sold under the trade name kapton®, is a suitable material, but this is only one of many possibilities. The dimensions and thickness of the coupon will in general be application specific.

The above-referenced disclosures to Spillman et al. use a contactless remote interrogation technique (such as by magnetic coupling of two inductive coils) to monitor or interrogate a conventional resistive strain gauge, for example. In the present embodiment, a capacitive strain gauge 100 is provided as described hereinafter. The capacitive strain gauge device can conveniently be incorporated with the substrate 12, but this is not a requirement to realize the present invention. The capacitive strain gauge 100 could alternatively be a discrete component that is connected to the apparatus 10, such as, for example, a hard wired connection to contact pads on the substrate 12.

The apparatus 10 includes a pair of inductive coils 14, 16. These coils are used to facilitate a remote contactless interrogation of the device 100, as described in the referenced disclosures. That description is not repeated herein as it is not necessary to understand fully and practice the present invention. Although the present embodiment shows the use of two coils 14, 16, those skilled in the art will appreciate that a single coil can alternatively be used if so desired for a particular application. Each coil 14, 16 is disposed on a respective surface of the substrate 12. The coils can be formed on the substrate 12 by a preferred method of copper etching. The substrate 12 initially is provided with a copper lamination, such as 0.0007 inch thick copper (½ ounce copper.) A mask, such as is used in conventional photo masking processes, is then used to pattern a photo resist layer on the copper laminated substrate. A suitable etchant is next applied to remove the copper other than the desired circuit pattern. In the described example, the circuit pattern includes the coils 14, 16 and a number of interconnecting lines 18 and contact pads 20 as needed for the particular interrogation circuit. A resistor R can also be disposed on the substrate, for example. The contact pads 20 can be used for other surface mounted components if so desired.

A fixed capacitor 22 is provided, which can be a surface mounted discrete capacitor, or a capacitor formed of two conductive plates etched on each side of the substrate 12, with the substrate serving as the capacitor dielectric. The fixed capacitor functions in this embodiment, with the capacitive device 100, to capacitively couple the coils 14, 16 together. Alternatively, the second capacitor 22 could also be a variable capacitance device such as the device 100, if so desired for a particular application.

The coils 14, 16 are shown in FIGS. 1 and 2 as being connected to the capacitive strain gauge 100 and the fixed capacitor 22. In contrast to the use of plated through holes as set forth in the referenced disclosures, the coils 14, 16 in this case are capacitively coupled to each other. The coils 14, 16 and the capacitive elements 22 and 100 (and the resistor R when used) thus provide a resonant circuit that will exhibit a resonant frequency that is a function of the capacitance of the strain gauge 100. In this manner, a determination of the resonant frequency of the resonant circuit will be related to and indicate the capacitance of the strain gauge 100. By providing a device 100 in accordance with the teachings of the present invention that exhibits a capacitance that varies in relation to strain, particularly such stresses having a component normal to the plane of the device 100 (which in this embodiment is also the plane of the substrate 12), measurement of the resonant frequency can be used to detect and/or measure such strain. Again, the resonant frequency can be obtained using a contactless magnetically coupled interrogation circuit 24 as described in the referenced disclosures, or via a hard wired or other suitable interrogation technique. The magnetic coupling is accomplished via the coils 14, 16 with a coil 25 associated with the interrogation circuit 24. By applying a variable frequency sweep of an excitation signal to the coils 14, 16, for example, the resonant frequency can readily be identified.

With reference to FIG. 3, an embodiment of a capacitive strain gauge device in accordance with the present invention is illustrated in cross-section, in the manner such device is used with the apparatus of FIG. 1. In FIG. 3, relative dimensions are greatly exaggerated for clarity and ease of illustration. In accordance with the present invention, a capacitive strain gauge 100 includes a dielectric material having a dielectric constant that varies in relation to z-axis strain (compression or tensile), i.e. a strain that has a force component normal to the plane of the device. The capacitance of the device 100 changes with the dielectric constant, and therefore can be used as a measure of the strain.

In the embodiment of FIG. 3, the capacitive strain gauge 100 includes a first self-assembled monolayer 102 and a second self-assembled monolayer 104. The term "self-assembled" refers to forming ordered monomolecular structures by the coordination of molecules to a surface. In this embodiment, each monolayer is constructed in essentially the same manner, therefore only one monolayer will be described.

The top monolayer 102 includes a rigid material 106 which serves as a base or substrate. In this embodiment, the base 106 is made of a thin layer of glass or other suitable rigid material.

A conductive layer 108, such as a thin film of gold, is disposed on the base 106. This layer will serve as one plate of the capacitor 100, and may be, for example, on the order of 50–1000 Å. The gold layer 108 can be deposited or attached to the base 106 by any suitable method such as electron beam evaporation. A dielectric material in the form of a layer of linear molecules 110 (and in the present example a second layer 112 attached to the other conductor plate 114), in this case a single layer or monolayer of alkanethiolate molecules, is attached to the gold conductor 108. Each molecule 110 is attached endwise to the conductive layer 108 and preferably oriented at an oblique angle α to the plane of the conductor, as illustrated in the drawing. A suitable process by which the layer of molecules 110 is attached endwise to the conductor 108 is microcontact printing used to produce self-assembled monolayers. Such a process is known to those skilled in the art, and is carried out by using an elastomeric "stamp", such as, for example, polydimethysiloxane (PDMS), that is "inked" with an alkanethiol such as, for example, hexadecanethiol ("HDT" $CH_3(CH_2)_{15}SH$). The stamp is then brought into contact with a gold surface with the SH end being attached to the gold surface. The self-assembled monolayer of alkanethiolates forms where the stamp and the gold surface make contact. A manual process can be used to bring the stamp and gold surface into contact. Cylindrical surfaces can also be patterned such as by rolling the gold surface (disposed on the cylindrical base such as a glass fiber) across the stamp. While the forgoing description is sufficient to practice the present invention, further discussion of such processes in the context of alternatives to microlithography is provided in FABRICATION OF SUBMICROMETER FEATURES ON CURVED SUBSTRATES BY MICROCONTACT PRINTING by Jackman, et al. *Science* (Vol. 269 Aug. 4, 1995) and articles cited therein.

The same microcontact printing process is used to attach a layer of molecules 112 to the other conductive layer 114 which forms the second conductor plate of the capacitor 100, disposed on a second glass base 116. Although a single layer of molecules for each conductor is preferred, additional layers could be used if so desired for a particular application.

The free ends 118 of the molecules lie adjacent to and in contact with the substrate 12 after assembly. In the case of building a discrete device 100 separate from the substrate 12, the monolayers lie such that the facing free ends of the molecules are adjacent each other. This alternative embodiment for a discrete device with facing monolayers is illustrated in FIG. 4.

Because the linear molecules have a dipole moment, the dielectric constant of the dielectric material between the plates 108, 114, and hence the capacitance of the device 100, is a function of the orientation of the molecules with respect to the electric field between the conductors 108 and 114. With the molecules being free to bend or rotate around their bonds to the conductor, their orientation is a function of the local strain in their immediate neighborhood or volume.

With reference to FIG. 3, if a tensile strain, for example, is applied to either or both of the bases 106, 116 having a force component normal to the plane of the bases, the effect will be to separate the bases 106, 116 somewhat, thereby aligning the affected molecules in a more perpendicular orientation to the plane of the conductor plate to which the molecules are attached. Conversely, a compressive strain applied to either or both of the bases 106, 116 will tend to align the molecules in a more parallel orientation with respect to the conductor plates 108, 114. Thus, in the "sandwich" configurations of FIGS. 3 and 4, relative displacement of the two conductive layers 108, 114 along their normals allows the molecules to rotate or bend about their attachment points. The flexibility of the molecules to this bending or rotation will be an important factor in the strain sensitivity. Preferably, for normal strain components, the relationship $\Delta\epsilon/\Delta strain<1$ should be maintained, where "$\epsilon$" is the dielectric constant. In both of these examples, the strain has a component in a direction normal to the plane of the conductive plates 106, 116, and this is also referred to herein as a "z-axis" strain.

When the strain gauge 100 is embedded in a composite structure, such as for example a laminated composite 130 (as exemplified in FIG. 4), the bases 106, 116 are preferably parallel with, and bonded to laminates 132, 134. Thus, when the laminated structure is subjected to z-axis strain, the strain can be detected and/or measured by the strain gauge device 100. In this example, the strain gauge is particularly useful for detecting z-axis strain that tends to cause delamination and other structural defects in a laminated composite structure. A strain gauge in accordance with the invention can also be useful for detecting localized and distributed residual strain present in such structures after the various high temperature/high pressure cure processes, and thus be used for detecting potential stress failure locations in such structures, for example.

A z-axis strain gauge device 100 in accordance with the invention can also be used in other structures that may or may not be laminated. Additionally, the strain gauge can function as a pressure sensor.

Those skilled in the art will appreciate that z-axis strain will tend to separate (or compress) the conductive plates 108, 114 thus causing relative displacement of the plates. This relative displacement will also affect the capacitance of the device 100. This change, however, will be small and difficult to detect with high sensitivity. The use of the self-assembled monolayers of linear molecules as a dielectric material for the capacitor produces a multiplication factor in the change in capacitance in response to strain (due to the attendant change in dielectric constant), thereby increasing the sensitivity of the device and permitting easier detection of the capacitance change.

As represented in FIGS. 3 and 4, it is believed that the sensitivity of the strain gauge 100 can be increased if so desired by oppositely polarizing the free ends of the molecules of the monolayers by using molecules having oppositely charged polar end groups at the molecule free ends. The polarized attraction between the molecule free ends of the facing monolayers help ensure that as the layers 108, 114 separate, the molecules 110 straighten. A suitable base molecule with a polar end group that will form a positive polarity when brought near to an acid end group (which will form a negative polarity) can be realized using chain lengthened molecules such as an amine, for example, commercially available 1-amino-3-propanethiol. A suitable acid molecule with COOH terminated free ends can be made by exposing the gold layers 108, 114 /to an ethanolic solution of mercaptohexadecanoic acid ("MHA" $HO_2C(CH_2)_{15}SH$).

For both the base and acid molecules, the length of the molecule can be increased by conventional methods known to those skilled in the art by adding $CH_2$ units to the backbone to increase flexibility of the molecules as needed for particular applications. Other base and acid molecules can also be used, such as a sulfonic acid or phosphoric acid to name more acid molecule examples and pyridine end group to name another base molecule example. These commercially available molecules can be chain lengthened as noted above.

Also illustrated in FIGS. 3 and 4, spaces or gaps 134 are placed, preferably at regular intervals between groups of the molecules 110. These spaces 134 allow for molecular displacements towards the layers 108, 114 in the case of compressive strain.

Although the exemplary embodiments of FIGS. 3 and 4 illustrate the molecules 110 being aligned obliquely under conditions of zero strain, other arrangements can be used depending on the specific application. For example, for applications where tensile strain is expected to be the primary strain being measured, the device 100 can be assembled with the plates 106, 116 squeezed together so that the molecules lie essentially flat or parallel with the layers 108, 114. This will maximize the elongation effect of the molecules realigning to a perpendicular orientation as the layers 108, 114 separate.

In the embodiment of FIG. 3, the device 100 can be mounted on the substrate 12 by bonding or otherwise attaching the glass bases 106, 116 to their respective surfaces of the substrate 12, thus providing the sandwiched configuration with two facing single layers of the molecules 110.

In either embodiment, the inductive coils 14, 16 can be electrically connected to the respective conductive layers 108, 114 by any suitable techniques such as soldering.

In still a further alternative, the dielectric material 110, 112 disposed between the conductive plates 108, 114 can be selected so as to elastically deform and retain its deformed condition after the strain is removed. In this manner, the device 100 would have a strain "memory" function in which the capacitance of the device would indicate the maximum strain applied to the device over time. For example, the monolayers of linear molecules can be formed with different molecules interspersed with each other, with the different molecules having different strain failure (elongation failure) characteristics. For example, polystyrene molecules have a typical strain failure characteristic of 1% elongation; polyvinychloride molecules have a typical 30% elongation failure; and polyethylene molecules have a typical 800% elongation failure. By interspersing such molecules throughout the dielectric layers, specific molecules will fail at different strain levels, thus permanently altering the dielectric constant of the dielectric material and capacitance of the device 100. The dielectric constant would thus serve as a "memory" of the maximum strain that the device was subjected to.

In applications where a strain gauge device in accordance with the invention is to be embedded in a composite structure, it will be appreciated that the dielectric material will need to be able to withstand the processing pressures and temperatures that will be used during the cure process for the composite materials. Furthermore, in structures such as laminated structures for example, the device should be designed so as not to weaken or otherwise deleteriously affect the structure in which the device is embedded.

FIG. 5 illustrates another embodiment of the capacitive strain gauge device, designated with the numeral 200. In this embodiment, a single monolayer of linear molecules is used.

The monolayer structure includes a rigid base 202 and conductive layer 204 having a single layer of molecules 206 attached endwise to the conductive layer 204. This structure can be the same as the corresponding structures described with respect to FIGS. 3 and 4 hereinabove. The conductive layer 204 forms one plate of the capacitive device. In this example, however, the monolayer arrangement is directly embedded into the structure, such as a laminated composite structure 210. The free ends of the molecules 206 contact one surface of the facing laminate 212, and by having a conductive laminate, such as for example, a carbon matrix composite, the laminate forms the other "plate" of the capacitive device 200. The free ends of the molecules 206 can be bonded to the laminate if so desired. Although omitted for clarity in FIG. 5, the structure 200 in practice can be sandwiched or embedded between laminates, with the outer surface of the base 202 being bonded to a laminate if so desired (see FIG. 4). The embodiment of FIG. 5 has the advantage of simpler construction, but will generally tend to exhibit lower sensitivity to normal or z-axis strain, and will tend to exhibit increased sensitivity to in-plane strain.

FIG. 6 illustrates another embodiment of the capacitive strain gauge device. In this embodiment, the planar rigid bases (106 and 116 in the embodiment of FIG. 3) are replaced by cylindrical elements 302, 304, in this example, glass fibers. Thin conductive layers 306 and 308 such as gold film are attached to or disposed on the fibers respectively. The linear molecule monolayers 310 and 312 are then attached endwise to the conductive layers 306, 308 respectively and aligned at an oblique angle generally relative to the outer surfaces of the conductive layers 306, 308. These fibers 302 and 304 can be directly embedded or otherwise integrally disposed in a structure such as a composite laminate. The fibers could be, for example, part of a fiber reinforcement structure in a composite matrix. In this example, direct electrical connection would be made to the conductive layers 306, 308 for interrogating the device 300 to determine the capacitance of the device. The device 300 could be electrically connected to a sensor circuit disposed on an embedded flexible substrate, such as is described in the referenced disclosures which illustrate a discrete resistive strain gauge electrically connected to an embedded sensor circuit on an embedded substrate.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A strain gauge device comprising: a capacitor having two spaced conductive surfaces, and a dielectric material between said conductive surfaces with a dielectric constant that varies in relation to strain normal to said surfaces, said dielectric material comprising a layer of linear molecules attached endwise to at least one of said conductive surfaces.

2. The device of claim 1 wherein each said molecule is attached at one end to a respective one of said conductive surfaces.

3. The device of claim 1 wherein each conductive surface of the capacitor has a layer of linear molecules attached endwise thereto, said conductive layers being disposed in a sandwich configuration with said molecule layers inwardly facing each other.

4. The device of claim 1 wherein each of said conductive surfaces is disposed on a respective rigid material surface.

5. The device of claim 4 wherein said dielectric material comprises a pair of single layer linear alkanethiolate molecules, each single layer being attached endwise to a respective one of said conductive surfaces and inwardly facing the other single layer, said rigid material comprises a glass layer and said conductive surfaces comprise gold film.

6. The device of claim 1 comprising a substrate that is embeddable in a composite structure, said capacitor and dielectric material being disposed on the substrate.

7. The device of claim 6 wherein said substrate is substantially planar, the device comprising an inductive coil disposed on the substrate and connected to said capacitor to form a resonant circuit wherein the capacitance of the resonant circuit varies in relation to said dielectric constant.

8. The device of claim 7 comprising an interrogation circuit for detecting changes in said capacitance, said interrogation circuit comprising a second inductive coil magnetically coupled to said first inductive coil for non-contact interrogation of the device.

9. The device of claim 7 comprising a detector circuit for detecting changes in said capacitance by determining resonant frequency of the resonant circuit.

10. The device of claim 7 comprising a second capacitor disposed on the substrate, said first inductive coil being disposed on a first surface of the substrate, and a second inductive coil disposed on a second surface of the substrate, said first and second coils being capacitively coupled by said first and second capacitors.

11. The device of claim 5 wherein said molecules are aligned at an oblique angle to their respective conductive surface under zero strain normal to said conductive surfaces.

12. The device of claim 1 wherein each conductive surface is disposed on a cylindrical surface.

13. The device of claim 12 wherein said cylindrical surface is defined by a reinforcement fiber used in a laminated composite structure.

14. The device of claim 13 wherein said fiber comprises glass.

15. The device of claim 1 wherein one of said conductive surfaces comprises a laminate in a composite structure.

16. The device of claim 1 wherein said dielectric material elastically deforms under strain so that the capacitor functions as a memory device for the maximum strain applied thereto.

17. The device of claim 1 wherein said dielectric material exhibits a dielectric constant that varies with strain, with the dielectric constant remaining at a value corresponding to maximum strain applied to the device.

18. The device of claim 17 wherein the dielectric material comprises a self-assembled layer of linear molecules attached endwise to at least one of said conductive surfaces, said molecule layer comprising a plurality of molecules having different strain failure characteristics.

19. The device of claim 6 wherein said substrate is embedded in a laminated structure, said dielectric material having a dielectric constant that varies in relation to z-axis delamination strain in the structure.

20. The device of claim 1 wherein the dielectric material comprises linear molecules, with the dielectric constant being a function of the orientation of said molecules relative to the conductive surfaces.

21. The device of claim 20 wherein said orientation of said molecules changes in relation to relative displacement of said conductive surfaces caused by strain.

22. A strain detector comprising: a capacitor having first and second conductive surfaces with a dielectric material between said surfaces, the dielectric material having a dielectric constant that varies in relation to strain normal to said first surface; said dielectric material comprising a first layer of linear molecules attached endwise to said first conductive surface.

23. A sensor for sensing a characteristic of a structure comprising: a capacitor that can be integrated with the structure for sensing the characteristic, the capacitor having two spaced conductive surfaces, and a dielectric material between said conductive surfaces, said dielectric material comprising linear molecules attached endwise to at least one of said conductive surfaces; said dielectric material having a dielectric constant that varies in relation to the characteristic.

24. The detector of claim 22 comprising a second layer of molecules attached to said second conductive surface, the capacitor formed with said first and second layers in facing relationship to each other to form a dielectric layer between said first and second conductive surfaces.

25. The detector of claim 22 wherein said linear molecules are oriented at an oblique angle with respect to said first conductive surface.

26. The detector of claim 22 wherein said dielectric material comprises a self-assembled monolayer with a dielectric constant that remains at a value based on maximum strain applied to said conductive surface.

27. A strain gauge device comprising: a capacitor having two spaced conductive surfaces, and a dielectric material between said conductive surfaces with a dielectric constant that varies in relation to strain normal to said surfaces; said dielectric material comprises a pair of single layer linear molecules with each layer being attached endwise to a respective one of said conductive surfaces and facing the other single layer.

28. A strain gauge device comprising: a substrate that is embeddable in a laminated structure, a capacitor having two spaced conductive surfaces, and a dielectric material between said conductive surfaces, at least one of said conductive surfaces and dielectric being disposed on said substrate, said dielectric material having a dielectric constant that varies in relation to delamination strain in the structure.

29. The apparatus of claim 28 wherein said laminated structure comprises composite material with the composite material forming one of said conductive surfaces.

30. The apparatus of claim 28 wherein said two conductive surfaces are disposed on said substrate.

31. The apparatus of claim 28 wherein said dielectric material comprises a layer of linear molecules attached endwise to at least one of said conductive surfaces.

32. The apparatus of claim 31 wherein said dielectric material comprises a self-assembled monolayer.

33. A strain gauge device comprising: a capacitor having two spaced conductive surfaces, and a dielectric material between said conductive surfaces with a dielectric constant that varies in relation to strain normal to said surfaces, said dielectric material comprising linear molecules, with the dielectric constant being a function of the orientation of said molecules relative to the conductive surfaces.

34. A strain gauge device comprising: a capacitor having two spaced conductive surfaces, and a dielectric material between said conductive surfaces with a dielectric constant that varies in relation to strain normal to said surfaces, said dielectric material comprising linear molecules attached endwise to at least one of said conductive surfaces; said molecule layer comprising a plurality of molecules having different strain failure characteristics.

* * * * *